(12) United States Patent
Altonen et al.

(10) Patent No.: US 6,959,524 B2
(45) Date of Patent: Nov. 1, 2005

(54) HEAT-TREATED PRESSURIZED PLASTIC CONTAINERS AND METHOD OF MAKING

(75) Inventors: Gene Michael Altonen, West Chester, OH (US); Su Yon Chang, Mason, OH (US); Michael Thomas Dodd, Florence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/850,277

(22) Filed: May 20, 2004

(65) Prior Publication Data

US 2005/0060953 A1 Mar. 24, 2005

Related U.S. Application Data

(60) Provisional application No. 60/472,255, filed on May 21, 2003.

(51) Int. Cl.[7] .............................. B65B 7/28; B65B 63/08; B29C 25/00
(52) U.S. Cl. .............................. 53/440; 53/452; 53/471; 53/127; 53/140; 53/281; 215/371; 264/524; 264/235; 264/346
(58) Field of Search .................. 53/440, 452, 470, 53/471, 127, 140, 281; 264/524, 235, 237, 346, 348; 215/371

(56) References Cited

U.S. PATENT DOCUMENTS

| | | | |
|---|---|---|---|
| 2,373,093 A | | 4/1945 | Baker |
| 3,733,309 A | * | 5/1973 | Wyeth et al. ............... 215/373 |
| 3,862,288 A | | 1/1975 | Su |
| 4,247,514 A | | 1/1981 | Luise |
| 4,385,089 A | | 5/1983 | Bonnebat et al. |
| 4,411,610 A | | 10/1983 | Poppe et al. |
| 5,401,451 A | * | 3/1995 | Meixner et al. ............. 264/83 |
| 5,691,016 A | * | 11/1997 | Hobbs ....................... 428/35.7 |
| 5,730,914 A | * | 3/1998 | Ruppman, Sr. ............. 264/28 |
| 5,770,135 A | * | 6/1998 | Hobbs et al. ................ 264/83 |
| 5,814,383 A | * | 9/1998 | Fehn ......................... 428/35.7 |
| 5,884,792 A | * | 3/1999 | Krishnakumar et al. ...... 53/440 |

FOREIGN PATENT DOCUMENTS

| | | |
|---|---|---|
| FR | 2291842 | 11/1974 |
| WO | WO 94/26497 | 11/1994 |
| WO | WO 01/45865 A1 | 6/2001 |

OTHER PUBLICATIONS

Durairaj, Raj; Canadian Packaging; Toronto; Sep. 2000; vol. 53; Issue 9; p. 46; "For better shelf–life extension: Resorcinol–based polymers offer much promise for food and beverage packaging applications". (ProQuest).*

Graff, Gordon; Modern Plastics; New York; May 1998; vol. 75; Issue 5; p. 61; "DESIGN: Alloys pump up air–powered spray device for refillable containers". (ProQuest).*

* cited by examiner

*Primary Examiner*—Stephen F. Gerrity
(74) *Attorney, Agent, or Firm*—Kenya T. Pierre; Vladimir Vitenberg; Tara M. Bosnell

(57) ABSTRACT

The present invention provides a heat-treated plastic pressurized container that is resistant to polar liquids and impact stresses and the process for making such container.

18 Claims, No Drawings

HEAT-TREATED PRESSURIZED PLASTIC CONTAINERS AND METHOD OF MAKING

CROSS-REFERENCE TO RELATED APPLICATION

This application claims the benefit under 35 USC 119(e) to U.S. application Ser. No. 60/472,255, filed May 21, 2003.

FIELD OF THE INVENTION

The present invention relates to a plastic pressurized package capable of being exposed to and containing polar liquids and is also impact resistant. The present invention also relates to the process for making such plastic pressurized packages.

BACKGROUND OF THE INVENTION

Pressurized or aerosol antiperspirant products have been marketed for many years. These products are typically packaged in metal cans or glass containers. For many products, it is advantageous for the package to be clear to permit the contents to be viewed by a user. While glass provides this option, it is typically expensive and can be very fragile when dropped. A much less common material used to form a pressurized package is plastic. Plastics, such as grades of amorphous polyamide and polyester, provide a clear container for viewing purposes and have the added advantages of being less fragile and more economical to produce versus glass. Plastic pressurized containers, however, are known to have at least two disadvantages. First, plastic materials are susceptible to degradation by certain polar liquids. For an aerosol container, this is extremely undesirable, since degradation of the plastic material can cause the container to vent its contents, which are frequently flammable. Additionally, the material can fragment into pieces, which could cause damage to the surroundings or injure the user. Furthermore, many of these polar liquids are frequently used in many common household products such as fine fragrances, rubbing alcohol, hand sanitizers, hair sprays, and the like. Thus, it is likely that during normal use, a plastic pressurized container could become exposed to polar liquids that degrade its structural integrity thereby causing the container to fail to contain its contents. Secondly, the structural integrity of a plastic container can be reduced by retained stresses generated during the manufacturing process or those generated when a container is dropped onto a hard surface.

SUMMARY OF THE INVENTION

The present invention provides a heat-treated plastic pressurized container that is resistant to polar liquids and impact stresses and the process for making such container. Applicants have discovered that thermal conditioning of a plastic pressurized container improves not only the container's resistance to failure caused by exposure to polar liquids but it also improves resistance to impact stresses to the container. The present invention not only provides an aesthetically pleasing package but also provides durability and safety for its intended use.

Other advantages and novel features of the present invention will become apparent to those skilled in the art from the following detailed description, which simply illustrates various modes contemplated for carrying out the invention. As will be realized, the invention is capable of other different obvious aspects, all without departing from the invention. Accordingly, the descriptions are illustrative in nature and not restrictive.

DETAILED DESCRIPTION OF THE INVENTION

The compositions of the present invention can comprise, consist essentially of, or consist of, the essential components as well as optional ingredients described herein. As used herein, "consisting essentially of" means that the composition or component may include additional ingredients, but only if the additional ingredients do not materially alter the basic and novel characteristics of the claimed compositions or methods.

All publications cited herein are hereby incorporated by reference in their entirety.

The term "plastic" is defined herein as any polymeric material that is capable of being shaped or molded, with or without the application of heat. Usually plastics are a homo-polymer or co-polymer that of high molecular weight. Plastics fitting this definition include, but are not limited to, polyolefins, polyesters, nylon, vinyl, acrylic, polycarbonates, polystyrene, and polyeurothane.

The term "clear" is defined herein as having the property of transmitting light without appreciable scattering so that bodies lying behind are perceivable. One acceptable test method for determining whether a product is clear is to attempt to read a series of words placed immediately behind the package. The words being printed in black color, 14 point Times New Roman font, printed on a white sheet of paper with the printed side of the paper attached to the back of the package. The word and/or letters must be visible and/or readable from the front of the package by an individual of reasonable eyesight and positioned directly in front of the package.

The term "frosted" is defined herein as the practice of inducing a low level of light scattering into an otherwise "clear" material causing the material to become matted in appearance.

The term "tinted" is defined herein as the practice of adding a low level of pigment of dye into a material for the purpose of imparting a color into the material.

The term "plastic package" refers to the container vessel of the pressurized package being made substantially of plastic. The sealing valve and actuator of the package may or may not necessarily be made substantially of plastic.

The term "pressurized plastic container" or "pressurized plastic package" is defined herein as a container with contents, where the contents have a pressure of at least 10 PSI greater than atmospheric pressure at 25° C.

The term "molecular stresses" describes the stress the molecules are subject to during the process of molding a plastic part.

As used herein, the term "retained stresses" describes the stresses generated and retained as a result of forming a solid plastic part from molten plastic. As the molten plastic is forced into the shape of the desired part and then cooled, the molecular chains that make up the plastic material cease to flow and are "frozen" into position with the part. Many of the frozen molecules are being bent by adjacent molecules causing the stress.

The term "resistant to impact stresses" describes an opposition to stresses, which ensures that the container of the present invention does not leak, or rupture when exposed to mechanical stresses such as impact on a hard surface.

The term "resistant to polar liquids" describes an opposition to polar liquids that would normally degrade and/or crack the plastic material. Resistance to polar liquids ensures that the container does not leak or rupture when exposed to polar liquids.

"Reduction in stresses" refers to the amount of stress observed when polarized light is defracted by the stress lines within a pressurized plastic package. The stresses can be qualitatively assessed by the degree of uniformity and intensity of the birefringence patterns. General polariscopes are capable of emitting light frequencies to display the birefringence patterns. A polarimeter, such as the LC-Polscope™ made by CRI, Inc., which contains patented technology, can be used to quantify the stresses by measuring the magnitude and angle of the phase shift created as the polarized light interfaces with the material.

The term "heat treating" is defined as the controlled heating, and cooling, of a plastic container for the purpose of relaxing molecular stresses in the container. The process involves heating a plastic container to a temperature just below the Glass Transition Temperature [Tg] of the plastic material that comprises the container, holding the container at this temperature for a period of time, and then cooling the container in a controlled manner to a lower temperature such as about 25 degrees centigrade.

All percentages, parts and ratios as used herein are by weight of the total composition, unless otherwise specified. All such weights as they pertain to listed ingredients are based on the active level and, therefore, do not include polar liquids or by-products that may be included in commercially available materials, unless otherwise specified.

It is also herein contemplated that the present invention may be practiced in many consumer products including, but not limited to, antiperspirants, deodorants, hairsprays, cooking sprays, beverages, perfumes, shaving creams/gels, or drug products.

Manufacturing of Packages

While injection stretch blow molding has proven to be a suitable manufacturer technique, other manufacturing techniques may be used. Various suppliers including, but not limited to, the Owens-Brockway Division of Owens-Illinois are capable of making packages of the present invention (e.g., specification number N-41701). In the formation of a plastic bottle formed using an Injection-Stretch-Blow-Molding (ISBM) molding process or an Injection Blow Molding (IBM) process, a semi-molten plastic tube is filled with pressurized air, thereby forcing the tube to expand outwardly to contact a mold surface in the shape of the desired container. Still another process, Injection Molding (IM), forms the container by forcing molten plastic into a mold in the desired container shape. Each of these processes, as well as other processes known to those skilled in the art, can be used to form a plastic container.

Heat Treatment Process

The present invention relates to the process for heat-treating plastic material in order that the plastic material can be used to form pressurized containers that are able to resist degradation when exposed to polar liquids and are more resistant to impact stresses. A process for making the heat-treated plastic pressurized container comprises the following steps:

molding a plastic material into a container;
applying thermal conditioning/annealing to said plastic material close to the relative glass transition temperature [Tg] of said plastic material;
holding the container at this temperature for a period of time;
cooling the container in a controlled manner to a lower temperature;
filling said container with a product;
filling said container with a propellant; and
crimping a valve, or other pressure tight fixture, to the container to entrap the pressurized product.

In another embodiment, the present invention provides a process for making the heat-treated plastic pressurized container comprising the following steps:

molding a plastic material into a container and applying thermal conditioning/annealing to said plastic material close to the relative glass transition temperature [Tg] of said plastic material during the molding process;
holding the container at this temperature for a period of time;
cooling the container in a controlled manner to a lower temperature;
filling said container with a product;
filling said container with a propellant; and
crimping a valve, or other pressure tight fixture, to the container to entrap the pressurized product.

In yet another embodiment, the present invention provides a process for making the heat-treated plastic pressurized container comprising the following steps:

molding a plastic material into a container;
filling said container with a product;
filling said container with a propellant;
crimping a valve, or other pressure tight fixture, to the container to entrap the pressurized product;
applying thermal conditioning/annealing to said plastic material close to the relative glass transition temperature [Tg] of said plastic material;
holding the container at this temperature for a period of time; and
cooling the container in a controlled manner to a lower temperature;

Another embodiment of the present invention provides a process for making the heat-treated plastic pressurized container comprising the following steps:

molding a plastic material into a container;
applying thermal conditioning/annealing to said plastic material close to the relative glass transition temperature [Tg] of said plastic material;
holding the container at this temperature for a period of time;
cooling the container in a controlled manner to a lower temperature;
filling said container with a product and a propellant; and
crimping a valve, or other pressure tight fixture, to the container to entrap the pressurized product.

In yet another embodiment, the present invention provides a process for making the heat-treated plastic pressurized container comprising the following steps:

molding a plastic material into a container;
applying thermal conditioning/annealing to said plastic material close to the relative glass transition temperature [Tg] of said plastic material;
holding the container at this temperature for a period of time;
cooling the container in a controlled manner to a lower temperature;
filling said container with a propellant;
filling said container with a product; and
crimping a valve, or other pressure tight fixture, to the container to entrap the pressurized product.

Materials of plastic parts useful in the present invention include, but are not limited to, polyamides, polyesters, polyester copolymers, polycarbonates, polyacrylates and mixtures thereof. Polyesters are preferably selected from the group consisting of polyethylene terephthalate (PET), polyethylene naphthalate (PEN), and mixtures thereof. Polyester copolymers are preferably selected from the group consisting of polyethylene terephthalate glycol-modified (PETG), polycyclohexanedimethanol terephthalate (PCT), polycyclohexanedimethanol terephthalate isophthalate (PCTA), polycyclohexanedimethanol terephthalate glycol (PCTG), and mixtures thereof. The polyester copolymers preferably comprise monomers selected from the group consisting of isophthalic acid (IPA), terephthalic acid (TPA), butane diol (BD), cyclohexanedimethanol (CHDM), ethylene glycol (EG), diethylene glycol (DEG) and mixtures thereof.

It is known to those skilled in the art, that the glass transition temperature [Tg] of the material used to comprise a plastic pressurized package must be sufficiently high to ensure the pressurized package does not deform at elevated temperatures. This is important since the pressurized package may be used, or stored, in locations with elevated temperatures such as a hot car in summer. It has been found that a material should preferably have a Tg of at least about 60° C., and more preferably greater than about 70° C., and even more preferably greater than about 80° C.

Glass transition temperatures of some plastics useful in the present invention are summarized by the following table 1:

TABLE 1

| Material | Tg (C.) | Monomers* |
| --- | --- | --- |
| Polyamides (crystalline) | 60–170 | |
| Polyamides (amorphous) | 93–192 | |
| Polyesters: | 69–125 | |
| PET | 70–80 | TPA + EG |
| PEN | 125 | TPA + Naphthalate |
| PET/PEN Blends | 78–84 | |
| Polyester Copolymers: | | |
| PETG | 76–83 | TPA + EG + CHDM |
| PCT | 69–71 | TPA + CHDM |
| PCTA | 87–89 | TPA + IPA + CHDM |
| PCTG | 82–85 | TPA + CHDM + EG |
| Polycarbonates | 145–150 | |
| Polyester/Polycarbonate Blends | 92–150 | |
| Polyacrylates (polymethyl methacrylate) | 90–110 | |

1. Molding

The plastic container can be formed using several available molding techniques well known to those skilled in the art. One such method, Injection Stretch Blow Molding (ISBM), starts by injection molding a preform, then conditions the preform outside of the mold to a predetermined temperature, then uses pressurized air to inflate the preform to the final bottle shape within a mold. Another such process, Injection Blow Molding (IBM), starts with an injection-molded preform, then conditions the preform to a pre-determined temperature while still in contact with the mold, then uses pressurized air to inflate the preform to the final bottle shape within a mold. Still another process, Injection Molding (IM), forms the container by forcing molten plastic into a mold in the desired container shape. Each of these processes, as well as other processes known to those skilled in the art, can be used to form a plastic container.

2. Thermal Conditioning/Annealing

Thermal conditioning, or annealing, is defined as the controlled heating, and cooling, of a plastic container for the purpose of relaxing molecular stresses in the container. A process for making the heat-treated plastic pressurized container comprises the following steps:

heating a plastic container to a temperature just below the Glass Transition Temperature [Tg] of the plastic material that comprises the container;

holding the container at this temperature for a period of time;

cooling the container in a controlled manner to a lower temperature such as about 25 degrees centigrade.

In the first phase of the process, heat is applied to the container elevating the temperature to a desired holding temperature. Raising the container temperature is typically accomplished by heating for at least about 1 minute. Raising the container temperature is typically accomplished by heating no more than about 90 minutes, preferably no more than about 10 minutes.

For a period of time, the container is held at a temperature of at least about 1 degree centigrade below the Tg of the plastic material comprising the container. For a period of time, the container is held at a temperature of no more than about 30 degrees centigrade below the Tg of the plastic material comprising the container, preferably no more than about 10 degrees below the Tg.

The container is held at a temperature for a time period of at least about 2 minutes, preferably at least about 5 minutes. The container is held at a temperature for a time period no more than about 90 minutes, preferably no more than about 30 minutes.

The container is cooled for a time period of at least about 2 minutes, preferably at least about 5 minutes. The container is cooled for a time period of no more than about 90 minutes, preferably no more than about 5 minutes.

The final temperature of the part is at least about 10 degrees centigrade, preferably at least about 20 degrees centigrade. The final temperature of the part is no more than about 40 degrees centigrade, preferably no more than about 30 degrees centigrade.

3. Product

Products useful to fill containers of the present invention include, but are not limited to, antiperspirants, deodorants, hairsprays, cooking sprays, beverages, perfumes, shaving creams/gels, or drug products.

4. Propellant/Pressurized Fluid

Several types of materials are used to pressurize the container of the present invention. These materials include, but are not limited to, propellants and compressed gases. Propellants of the present invention include, but are not limited to, butane, isobutane, propane, dimethyl ether, 1,1 difloroethane and mixtures thereof. Compressed gases of the present invention include, but are not limited to, nitrogen ($N_2$), carbon dioxide ($CO_2$), and mixtures thereof.

Resistance to Polar Liquids

The inventors have found that heating a plastic part to a temperature just below its Glass Transition (Tg) temperature, holding this temperature for a predetermined period of time, then cooling the plastic part, results in the part being rendered more resistant to certain polar liquids.

Without being limited by theory, heat treatment is believed to relieve molecular level stresses that are created in the process of molding a plastic part. These stresses are generated as the molten plastic is forced into the shape of the desired part, or container, and then cooled to form a solid plastic part. As the material is cooled, the molecular chains that make up the plastic material cease to flow, and are "frozen" into position within the part. Many of these molecules are under stress when "frozen" in the solid part shape and the molecules are essentially being bent by adjacent molecules resulting in retained stresses. The temperature of the mold surface is substantially lower than the Tg of the plastic material. Thus, the plastic material is very quickly "frozen" as it contacts the mold surface.

In the case of a pressurized container formed from a material such as amorphous polyamide using a process such as ISBM, the inventors have discovered that these retained stresses diminish the resistance of the material to polar liquids. Amorphous polyamide is "glued" together by hydrogen bonding holding adjacent polyamide molecules together which prevent them from moving or rotating within the plastic part. When the polyamide structure is exposed to a polar solvent, the polar solvent reacts with the hydrogen bonding locations in the molecule and release the molecules to rotate, or bend, to relieve the retained stresses from molding. This rotation, or bending, creates voids in the surface of the amorphous polyamide part. These voids in the surface of the polyamide part allow the polar solvent to permeate into the plastic part, thus allowing the polar solvent to reach and react with additional hydrogen bonding sites. The polar liquids will continue to penetrate the amorphous polyamide part until the concentration of the polar solvent is depleted, or a region of the part with very low stress or no stress is encountered.

Again, without being limited by theory, heat-treating a plastic part by the process of the present invention acts to relieve the retained stresses created during molding. Heat treatment allows the molecular chains in a molded plastic part to rotate, or move, to a more stress free position in the plastic part, thereby relieving the stresses retained from the molding process. The part is now substantially stress free, and when exposed to a polar solvent, the molecular chains do not rotate, or move, and thus no voids are created in the surface of the part. The solvent is unable to penetrate or degrade the structural integrity of the plastic part. The structural integrity of the plastic part is substantially unaffected by the polar solvent.

Resistance to Impact

The inventors have also discovered that heating a plastic part to a temperature just below its Glass Transition [Tg] temperature, holding this temperature for a predetermined period of time, then cooling the plastic part, results also in the part being rendered more resistant to impact stresses. It is well known within the art of molding, that stresses retained from molding render a molded part more susceptible to damage, or deformation, by mechanical stresses. For a pressurized container, it is highly desirable to ensure that the container does not leak or rupture when exposed to mechanical stresses such as impact on a hard surface.

Without being limited by theory, the present inventors have found that heat treatment of a plastic part relieves molecular stresses. Heat treatment of a plastic pressurized container results in the container being more resistant to impact stresses. This improved resistance to impact is illustrated in Table 2:

TABLE 2

Heat treatment effect on impact resistance of a polyester pressurized container

| POLYESTER VARIANT | Heat Treated (78° C. for 90 minutes) | NOT HEAT TREATED |
| --- | --- | --- |
| Polyester copolymer with Ethylene Glycol (Voridian 9921) | 0% failures dropped from 18' onto concrete floor (n = 10) | 83% failures dropped from 18' onto concrete floor (n = 6) |

EXAMPLES

The following examples illustrate the claimed heat-treated pressurized containers and the process for making heat-treated pressurized containers. Examples of the present invention are not intended to be limiting thereof:

Example 1

Annealing Method for Amorphous Polyamide

The following method is used to anneal an amorphous nylon bottle.

Equipment: Thermolyne Mechanical Oven

Oven is preheated to 90° C., upon opening door oven temperature drops to approximately 60° C. Bottles are place in oven and the temperature is allowed to go back to 90° C. before beginning timer. Bottles sit at 90° C. for 90 minutes at which point the oven is turned off. Samples are allowed to cool for a minimum of 60 minutes in the oven. The bottles should not be removed from the oven until the temperature in the oven is 30° C. or less.

Other ovens and other heat settings and durations can be used to complete annealing. These conditions can be determined through experimentation. Equipment such as a Blue M environmental chamber can be used to complete the annealing process.

Example 2

Annealing Method for Polyester

The following method is used to anneal a polyester bottle.

Equipment: Thermolyne Mechanical Oven

Oven is preheated to 78° C., upon opening door oven temperature drops to approximately 60° C. Bottles are place in oven and the temperature is allowed to go back to 78° C. before beginning timer. Bottles sit at 78° C. for 90 minutes at which point the oven is turned off. Samples are allowed to cool for a minimum of 60 minutes in the oven. The bottles should not be removed from the oven until the temperature in the oven is 30° C. or less.

Other ovens and other heat settings and durations can be used to complete annealing. These conditions can be determined through experimentation. Equipment such as a Blue M environmental chamber can be used to complete the annealing process.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A plastic pressurized bottle produced by the process of:
    a) forming a material into a plastic bottle;
    b) heating said bottle to a temperature about 5° C. to about 15° C. below the Tg of the material;
    c) holding said bottle at said temperature for a period of time;
    d) cooling said bottle in a controlled manner to a lower temperature;
    e) filling said bottle with a product;
    f) pressurizing sad bottle with a propellant;
    g) closing said filled and pressurized bottle with a valve; and
    wherein said filled and pressurized bottle is resistant to polar liquids, resistant to impact stresses, and the combinations thereof.

2. The bottle of claim 1 wherein said material is selected from the group consisting of polyamides, polyesters, polycarbonates, polyacrylates and mixtures thereof.

3. The bottle of claim 2 wherein the polyester is selected from the group consisting of polyethylene terephthalate (PET), polyethylene naphthalate (PEN), and mixtures thereof.

4. The bottle of claim 3 wherein the polyester is polyethylene terephthalate (PET).

5. The bottle of claim 2 wherein the polyester comprises copolymers selected from the group consisting of polyethylene terephthalate glycol-modified (PETG), polycyclohexanedimethanol terephthalate (PCT), polycyclohexanedimethanol terephthalate isophthalate (PCTA), polycyclohexanedimethanol terephthalate glycol (PCTG), and mixtures thereof.

6. The bottle of claim 5 wherein the polyester copolymer comprises monomers selected from the group consisting of isophthalic acid (IPA), terephthalic acid (TPA), butane diol (BD), cyclohexanedimethanol (CHDM), ethylene glycol (EG), diethylene glycol (DEG) and mixtures thereof.

7. The bottle of claim 1 wherein the material is an amorphous polyamide.

8. The bottle of claim 7 wherein the material is heated about 5° C. to about 15° C. below about 93° C. and 192° C.

9. The bottle of claim 1 wherein the bottle is pressurized from about 10 psi to about 100 psi at 25° C.

10. The bottle of claim 1 wherein the forming of a said plastic bottle is accomplished using Injection Stretch Blow Molding (ISBM).

11. The bottle of claim 1 wherein the forming of a said plastic bottle is accomplished using Injection Blow Molding (IBM).

12. The bottle of claim 1 wherein the forming of said plastic bottle is accomplished using Injection Molding (IM).

13. The bottle of claim 1 wherein the product is selected from the group consisting of antiperspirants, deodorants, hairsprays, cooking sprays, liquids, perfumes, shaving cream/gels and drug products.

14. The bottle of claim 1 wherein the bottle is clear.

15. The bottle of claim 1 wherein the bottle is frosted.

16. The bottle of claim 1 wherein the bottle is tinted.

17. A process of making a filled and pressurized plastic bottle, the process comprising the steps of:
  a) forming a material into a plastic bottle;
  b) heating said bottle to a temperature about 5° C. to about 15° C. below the Tg of the material;
  c) holding said bottle at said temperature for a period of time;
  d) cooling said bottle in a controlled manner to a lower temperature;
  e) filling said bottle with a product;
  f) pressurizing said bottle with a propellant;
  g) closing said filled and pressurized bottle with a valve; and
  wherein said filled and pressurized bottle is resistant to polar liquids, resistant to impact stresses, and the combinations thereof.

18. The process of claim 17 wherein the product is selected from the group consisting of antiperspirants, deodorants, hairsprays, cooking sprays, liquids, perfumes, shaving creams/gels and drug products.

* * * * *